Oct. 9, 1951  P. L. PRYOR  2,570,273
METHOD OF MAKING OPTICAL PELLICLES
Filed Sept. 20, 1948

INVENTOR.
PAUL L. PRYOR
BY Wade Kounty
ATTORNEY
H. H. Losche and
AGENT

UNITED STATES PATENT OFFICE 2,570,273

METHOD OF MAKING OPTICAL PELLICLES

Paul L. Pryor, Osborn, Ohio

Application September 20, 1948, Serial No. 50,231

5 Claims. (Cl. 18—56)

(Granted under the act of March 3, 1883, as amended April 30, 1928; 370 O. G. 757)

The invention described herein may be manufactured and used by or for the Government for governmental purposes without payment to me of any royalty thereon.

This invention relates to optical pellicles and the method of making them but more particularly to the method of stretching standard manufactured sheet plastic material and framing the stretched portion for use as optical membranes.

Optical pellicles are usually defined as thin optical membranes held in frames in a stretched or taut condition. Because of the thinness of the membranes being about one thousandth to five thousandths of an inch, the optical effect of variations in the planeness of the two surfaces is very slight which is quite an advantage over glass plates where wedge angles thereof affect the transmitted or reflected light. Such pellicles are often used, when coated with a semireflecting surface, as transmitting mirrors or beam splitters. When dyed with a transparent color, they are used as optical filters.

The usual method of making pellicles is to flow lacquer or plastic resin plasticizer solution onto a polished plate such as glass and, after a reasonable degree of hardness is reached, the thin film is stripped off and mounted on a rigid frame, usually done under water. The pellicle and frame are then allowed to cure further, the plasticizer, solvent and moisture subsequently removed, and the membrane further tightened until a reasonably flat pellicle results. Pellicles made in this manner require considerable time in processing the membrane which processing operations also require very delicate and careful handling of the membrane. Curing of the membrane in its frame causes the membrane to become very tight which oftentimes results in breakage from shock or tension. The delicate manner in which the membrane must be handled, the time required for processing and the probability of failure make these pellicles quite expensive.

In the present invention, the pellicles may be made from sheet plastic of standard stock supplied by plastic manufacturers. This sheet plastic can be made in different ways, such as, casting, extruding, molding, or sheeting. The curing can be completed, or partially completed, before the plastic is used. The material can be coated or uncoated. A wide selection of materials are available having a wide range of properties suitable for different applications, such as; regenerated cellulose (cellophane), cellulose acetate, cellulose acetate butyrate, ethyl cellulose, cellulose nitrate, polyvinyl butyrate, polystyrene, methyl methacrylate, allyl ester monomer and coated gelatine. Sheets of this material are stretched or held taut while at ordinary temperature and free from solvents or softeners to produce a drum-head like film and the stretched portion secured in a frame. The frames may be of any shape as dictated by the use to which the pellicles are to be put but are ordinarily circular.

It is a primary object of this invention to provide optical pellicles of sheet plastic.

It is another principal object of this invention to provide a method of producing optical pellicles from sheet plastic.

It is a further object of this invention to provide optical pellicles capable of withstanding shock, temperature and humidity changes by resiliently mounting an optical membrane in a frame.

It is still another object of this invention to provide a method of tensioning an area of thin sheet plastic material and securing a portion of the tensioned area in a retaining frame for producing optical pellicles.

These and other objects and advantages will become more apparent by reference to the specification when taken in conjunction with the accompanying drawing forming a part thereof, in which.

Figure 1:
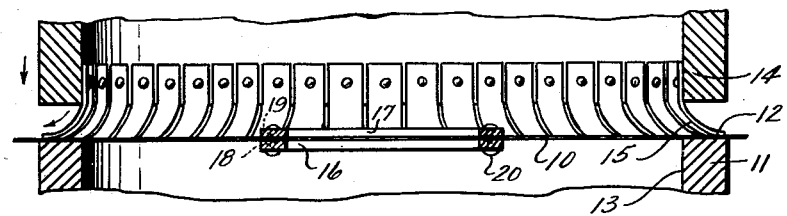
Fig. 1 shows one form of tensioning and framing plastic sheet material in accordance with this invention.

Referring to the several views of the drawing in which like characters of reference refer to corresponding parts, and more particularly referring to Fig. 1, there is shown a piece of sheet plastic material 10 that is laid across an element 11 having a flat top surface 12 and a central opening 13. While the peripheral shape of the flat top surface is not important, it is preferable that the element 11 be circular and fixed stationary in any well known manner. A tensioning member 14, of substantially the same shape and diameter as the top surface 12 of the element 11 and in alignment therewith, is adjustably movable longitudinally toward the element 11. The tensioning member 14 has a plurality of tensioning fingers 15 on the bottom thereof that normally extend radially outward at a slight angle. Upon lowering the tensioning member 14, the tensioning fingers 15 engage the plastic sheet material 10 on the side opposite the stationary element 11 and force the plastic sheet outwardly in all directions, the fingers being arranged to offer greater resistance to slip with the plastic sheet than the stationary element 11. The degree of tautness of the plastic sheet is determined by the downward force applied to the tensioning member 14. While the plastic sheet 10 is being held in this taut condition, a pair of frame members 16 and 17 having corresponding openings 18 and 19 are placed on opposite sides of the stretched sheet 10 with the drilled openings 18 and 19 in alignment, the plastic sheet is punched at the places where the drilled openings occur and the two frame members 16 and 17 fastened together with rivets 20 clamping the plastic sheet therebetween. Plastic sheet 10 is then released by the tensioning member 14 and the frame cut out of the sheet at its outer perimeter. The resulting pellicle comprising of the frame stretched plastic sheet may then be polished, coated, or otherwise processed for the use to which it is to be put.

Protection against abrasion and changes of humidity can also be achieved by the selection of the proper coating. This coating can be applied when the sheet is manufactured, or it can be applied during the process of forming the pellicles, or when the pellicles are finished. It can be applied in any of the known ways such as dipping, brushing, "flame-spraying," evaporation, or sputtering.

In order to eliminate minor optical imperfections which occur on the surface of some plastic materials, a polishing step may be introduced in this method. This polishing step may consist of buffing, or flaming, or it may be accomplished by pressing the material between two polished heated plates. For some purposes, some materials will not require polishing. The surface of the material such as regenerated cellulose or gelatine can be polished in the above manner if the proper coating is selected.

Figure 2:
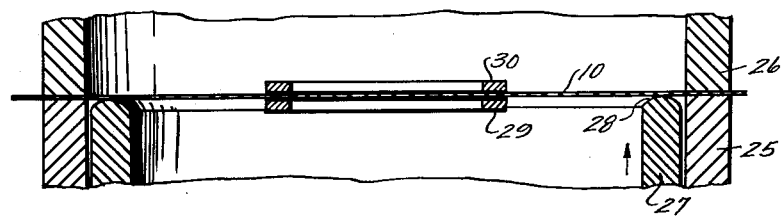
Fig. 2 shows a modification of the form of tensioning and framing sheet plastic material.

Referring now to Fig. 2, there is shown another modification of the means for stretching the sheet plastic and framing means. In this modification, plastic sheet 10 is held in a substantially flat position by annular clamping jaws 25 and 26. An annular tensioning member 27 having a rounded top rim portion 28 and of a diameter to slidably fit within the lower jaw 27 is movable to engage the underside of the plastic sheet to stretch it and hold it in the stretched condition while frame members 29 and 30 are fixed to opposite sides of the plastic sheet. As illustrated in this figure, the frames 29 and 30 are cemented or held by an adhesive substance to the plastic sheet 10. When the cement or adhesive is fast, the pellicle so formed is cut from the plastic sheet 10 for use.

Figure 3:
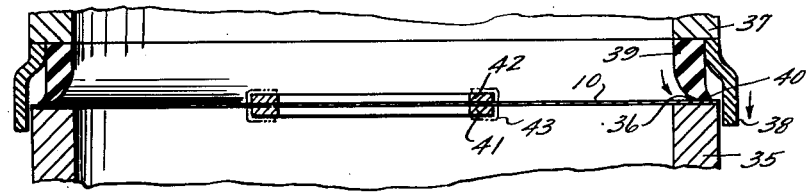
Fig. 3 shows another modification of the method of tensioning and framing sheet plastic material.

In the modification of Fig. 3, an annular stationary member 35 has the plastic sheet 10 laid over a flat top portion 36 thereof in a manner similar to that shown and described for Fig. 1. A tensioning member 37 has an annular depending portion 38 adapted to slidably fit over the annular stationary member 35. A resilient ring of rubber or the like 39 having a depending lip portion 40 is retained within the annular depending portion 38. The depending lip portion 40 of the resilient ring 39 is flanged outwardly such that downward movement of the tensioning member 37 brings the depending lip 40 into engagement with the plastic sheet and a compressive force on the resilient ring forces the lip 40 radially outward pulling the plastic sheet radially outward making it uniformly taut. Two annular ring parts 41 and 42 are then clamped on the plastic sheet 10 by any suitable clamping means and the plastic sheet cut at the outer periphery. A metal band 43 (shown in phantom lines since this band is only positioned after the pellicle is cut from the plastic sheet) is then placed over the outer periphery of the frame parts 41 and 42 and spun or crimped over the edges thereof to hold the plastic sheet in place forming a pellicle for use.

Figure 4:
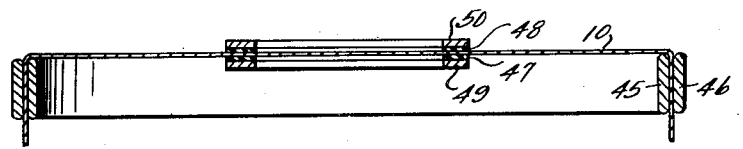
Fig. 4 shows still another modification of the tensioning and framing means.

Fig. 4 shows the plastic sheet 10 being stretched by placing the sheet over a hoop 45 and slipping a second hoop 46 downwardly over the first hoop 45 in the same manner that crochet hoops are used to tighten a portion of cloth. While the plastic sheet is held taut, a composite frame of two rings 47 and 48 of resilient material and two stiff rings 49 and 50 are cemented or otherwise secured in alignment on opposite sides of the sheet 10 with the resilient rings being next adjacent the opposite sides of the plastic sheet and between the stiff rings. The pellicle so formed is then cut out of the plastic sheet for use. Any local stresses or increased stretch in the plastic sheet otherwise endangering rupture of the plastic membrane is relieved by the rings 47 and 48 due to their resilience.

While, for the purpose of illustration, each of the figures show modifications of methods of tensioning the plastic sheet as well as methods of framing the plastic membrane, it is to be understood that the framing methods can be used in any combination with the methods of tensioning the plastic sheet. All pellicles so produced may be processed for various uses as formerly described of the pellicle in Fig. 1.

It is to be further understood that other modifications and changes may be made in the details of construction and the method steps without departing from the spirit and scope of this invention and I desire to be limited only by the scope of the appended claims.

I claim:

1. A method of producing optical pellicles comprising, stretching a thin plastic sheet at ordinary temperatures and while free from solvents and softeners to obtain equal stress in all directions, securing a stiff frame to a portion of said stretched plastic sheet and cutting said framed portion of said plastic sheet from the whole plastic sheet.

2. A method of producing optical pellicles comprising, stretching a thin sheet of plastic material to obtain equal stress in all directions, placing stiff rings in alignment on opposite faces of the stretched plastic sheet and securing these rings together with said plastic sheet secured therebetween, cutting said plastic sheet at the outer perimeter of said rings, polishing the plastic sheet membrane formed in said frame to obtain optical flatness thereof, and coating said membrane for the purpose it is to be used whereby the framed plastic sheet membrane provides an optical pellicle of good optical qualities.

3. A method of producing optical pellicles comprising, stretching a thin sheet of transparent plastic material, adhesively securing similar stiff rings in alignment to opposite surfaces of the stretched portion of said plastic sheet, cutting the optical pellicle so formed from said plastic sheet at the outer perimeter of said stiff rings, and polishing and coating the framed plastic sheet for optical use.

4. A method of producing optical pellicles comprising; stretching a thin sheet of transparent plastic to obtain equal stress in all directions;

securing a ring of resilient material to opposite surfaces of said plastic sheet, said rings being of equal diameter and in alignment; securing an inflexible ring equal in diameter to said resilient rings to the surface of each resilient ring and in alignment therewith to produce a framed membrane optical pellicle; cutting the pellicle so formed from said plastic sheet; polishing said pellicle membrane to produce optical flatness; and coating said pellicle membrane for the optical use to which the pellicle is to be put.

5. The method of making a pellicle from plastic membrane which comprises stretching said membrane outwardly within an elastic ring, while the membrane is at ordinary temperature and free from solvents and softeners enclosing a central portion of the so-stretched membrane by a stiff ring and flattening the membrane enclosed by the stiff ring to optical parallelism by smoothing the membrane between polished flat hard surfaces.

PAUL L. PRYOR.

REFERENCES CITED

The following references are of record in the file of this patent:

UNITED STATES PATENTS

| Number | Name | Date |
| --- | --- | --- |
| 1,333,744 | Wente | Mar. 16, 1920 |
| 1,404,668 | Tillyer | Jan. 24, 1922 |
| 1,582,564 | Vredenburg | Apr. 27, 1926 |
| 1,926,649 | Reinhold | Sept. 12, 1933 |
| 1,945,933 | Chilowsky et al. | Feb. 6, 1934 |
| 2,058,703 | Malivert | Oct. 27, 1936 |
| 2,174,269 | Land | Sept. 26, 1939 |
| 2,182,585 | Green | Dec. 5, 1939 |
| 2,397,242 | Chubb | Mar. 26, 1946 |
| 2,401,044 | Brandt | May 28, 1946 |

OTHER REFERENCES

Plexiglass—Fabricating Manual—Rohm and Haas Co.—Washington Square, Philadelphia, Pa.—9th Edition—1945—Pages 17–21—Copy in 88–55 E.